(12) United States Patent
Kanayama

(10) Patent No.: US 8,687,059 B2
(45) Date of Patent: Apr. 1, 2014

(54) IMAGE TAKING SYSTEM AND LENS APPARATUS

(75) Inventor: Masaomi Kanayama, Saitama (JP)

(73) Assignee: Canon Kabushiki Kaisha (JP)

( * ) Notice: Subject to any disclaimer, the term of this patent is extended or adjusted under 35 U.S.C. 154(b) by 704 days.

(21) Appl. No.: 12/613,338

(22) Filed: Nov. 5, 2009

(65) Prior Publication Data

US 2010/0110182 A1    May 6, 2010

(30) Foreign Application Priority Data

Nov. 5, 2008    (JP) .................................. 2008-283931

(51) Int. Cl.
*H04N 7/18*    (2006.01)

(52) U.S. Cl.
USPC ....................................................... 348/140

(58) Field of Classification Search
USPC ................... 348/135, 143; 382/106
See application file for complete search history.

(56) References Cited

U.S. PATENT DOCUMENTS

| | | | | |
|---|---|---|---|---|
| 6,801,639 | B2 * | 10/2004 | Nonaka et al. ................ | 382/106 |
| 2002/0150308 | A1 * | 10/2002 | Nakamura .................... | 382/286 |
| 2008/0089557 | A1 * | 4/2008 | Iwaki et al. ................... | 382/106 |

FOREIGN PATENT DOCUMENTS

| | | |
|---|---|---|
| JP | 02-074935 A | 3/1990 |
| JP | 6-331883 A | 12/1994 |
| JP | 08-076009 A | 3/1996 |
| JP | 2003-329915 A | 11/2003 |
| JP | 2005-189318 A | 7/2005 |
| JP | 2005-300349 A | 10/2005 |
| JP | 2007-003785 A | 1/2007 |
| JP | 2008-170645 A | 7/2008 |

* cited by examiner

*Primary Examiner* — Dave Czekaj
*Assistant Examiner* — Tracy Li
(74) *Attorney, Agent, or Firm* — Rossi, Kimms & McDowell LLP

(57) ABSTRACT

An image taking system includes a lens apparatus 1 and a camera 2 which performs a shooting using the lens apparatus. The system comprises a distance calculator 114 which calculates an object distance in each of a plurality of ranging areas 1 to 16 provided in an image-taking range, a distance information generator 114 which generates distance information indicating at least one of the object distance calculated by the distance calculator and a difference between the object distances, an extractor 115 which extracts, out of the plurality of ranging areas, a ranging area where the object distance calculated by the distance calculator is in a first range A, and an output image generator 203 which generates an output image including a shot image generated by the camera and the distance information corresponding to the ranging area extracted by the extractor.

11 Claims, 12 Drawing Sheets

IMAGE TAKING SYSTEM AND LENS APPARATUS

BACKGROUND OF THE INVENTION

1. Field of the Invention

The present invention relates to an image taking system and a lens apparatus which have a ranging function.

2. Description of the Related Art

In a live telecast of marathon, the distance between a top runner and a second runner is often announced. The distance between the runners at this time may be a rough distance which has been measured by eye of an announcer or a reporter, or may be a distance which has been calculated by using the time from the top runner has passed through until the second runner passes through a certain point and the running speed of each runner. Therefore, the distance between the runners given by the announcer or the reporter is not precise. Further, viewers can not visually recognize the distance by just being given to the viewers by the announcer or the reporter.

Japanese Patent Laid-open No. 2003-329915 discloses an image taking system as described below. First, a focusing is manually performed for a first object, and a distance to the first object is calculated based on a position of a focus lens at the time of being in an in-focus state. Next, similarly to the case of the first object, a focusing is manually performed for a second object, and a distance to the second object is calculated based on a position of the focus lens at the time of being in the in-focus state. Then, the difference between the calculated first and second object distances is obtained to superimpose the difference information with a video signal to display it.

Japanese Patent Laid-open No. 6-331883 discloses a ranging apparatus as described below. The ranging apparatus irradiates light for ranging to a plurality of objects corresponding to a plurality of ranging points, and calculates a distance to the object at each ranging point by receiving reflected light from each object. Further, the plurality of ranging points are divided into a plurality of groups based on distributions of the positions and the calculated distances. A group which has a size similar to a predetermined size among the plurality of groups are regarded as an in-focus state group, and a focus control is performed based on the calculated distance of the in-focus state group.

However, in an image taking system disclosed in Japanese Patent Laid-open No. 2003-329915, in order to calculate the distances of the first and second objects, a focusing has to be performed for each of the first and second objects. In other words, the distance to the second object can not be calculated while the in-focus state for the first object that is a main shot target is maintained.

In the image taking system, since the distance between both objects is obtained after the distance to the first object is calculated and the focusing is performed for the second object, a real distance between the objects may change before the distance between the objects is obtained. In other words, when the real distance between the objects changes from moment to moment in a marathon race or the like, the distance between the objects which rapidly reflects the changes can not be calculated.

In a ranging system disclosed in Japanese Patent Laid-open No. 6-331883, it is possible to calculate the object distances at the plurality of ranging points regardless of the current in-focus state. However, it is necessary to select a targeted object out of the plurality of ranging points. In addition, in the ranging system, although one group is selected out of a plurality of groups, at least two objects (runners) needs to be selected in performing a distance display in a marathon live or the like. Further, it is often the case that a person who is not a runner or an object that has a size similar to a person, other than a main object that is a runner, is shot at the same time. Therefore, it is difficult to determine whether or not it is the main object (runner) based on the size of the group.

BRIEF SUMMARY OF THE INVENTION

The present invention provides an image taking system and a lens apparatus configured to be able to automatically select a main object out of a plurality of objects and to display a distance to the main object or a difference between object distances.

An image taking system as one aspect of the present invention includes a lens apparatus and a camera configured to perform a shooting using the lens apparatus. The image taking system comprises a distance calculator configured to calculate an object distance in each of a plurality of ranging areas provided in an image-taking range, a distance information generator configured to generate distance information which indicates at least one of the object distance calculated by the distance calculator and a difference between the object distances, an extractor configured to extract, out of the plurality of ranging areas, a ranging area where the object distance calculated by the distance calculator is in a first range, and an output image generator configured to generate an output image including a shot image generated by the camera and the distance information corresponding to the ranging area extracted by the extractor.

A lens apparatus as another aspect of the present invention comprises the distance calculator, the distance information generator, and the extractor.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Embodiment 1

Figure 1:
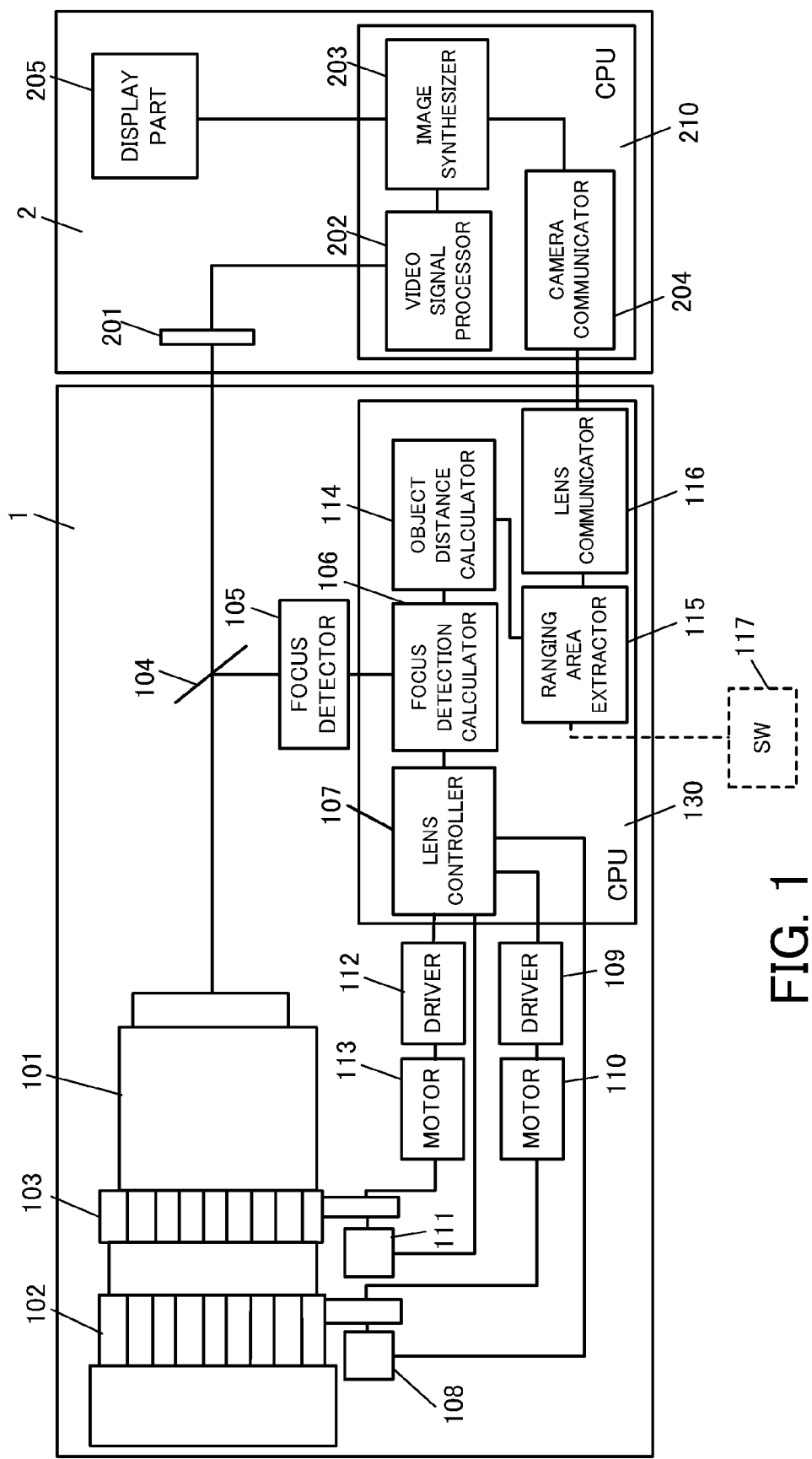
FIG. 1 is a block diagram showing a configuration of an image taking system that is Embodiment 1 of the present invention.

FIG. 1 shows a configuration of an image taking system that is Embodiment 1 of the present invention. The image taking system includes a lens apparatus 1 and a video camera 2. The lens apparatus 1 is detachable (interchangeable) with respect to the camera 2.

In the camera 2, reference numeral 201 denotes an image pickup element (hereinafter, referred to as a CCD) which is constituted by a CCD sensor, a CMOS sensor, or the like.

In the lens apparatus 1, reference numeral 101 denotes a lens barrel and the lens barrel 101 includes an image taking optical system including an optical adjusting member such as a focus lens, a magnification-varying lens and an iris (not shown). The image taking optical system is a so-called front-focus type system where the focus lens is arranged at a position closest to an object side in the image taking optical system.

The lens barrel 101 is provided with a focus driving ring 102 which transmits a driving force from a focus motor 110 to a focus lens to move the focus lens in an optical axis direction. Further, the lens barrel 101 is provided with a zoom driving ring 103 which transmits a driving force from a zoom motor 113 to a magnification-varying lens to move the magnification-varying lens in the optical axis direction.

A half mirror 104 is provided behind the lens barrel 101 (image plane side) in the lens apparatus 1. A light beam from the object which has passed through the lens barrel 101, i.e. which has entered the lens apparatus 1, and has reached the half mirror 104 is divided into a light beam transmitted through the half mirror 104 and a light beam reflected by the half mirror 104.

The light beam transmitted through the half mirror 104 enters the CCD 201. The light beam reflected by the half mirror 104 enters a focus detector 105 which is provided at a position conjugate with the CCD 201 in the lens apparatus 1.

Figure 2:
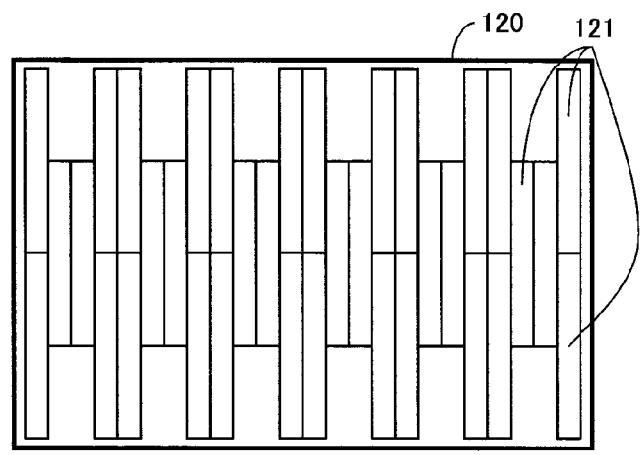
FIG. 2 is a diagram showing a configuration of an AF sensor in Embodiment 1.

The focus detector 105 includes a plurality of pairs of secondary image-forming lenses (not shown) and an AF sensor 120 as a phase difference sensor shown in FIG. 2. A plurality of pairs of line sensors (linearly-arranged photoelectric conversion elements) 121 which correspond to a plurality of ranging areas previously set in an image-taking range (image-taking screen) that is a photographable range by the camera 2 via the lens apparatus 1 are provided on the AF sensor 120.

A pair of object images (hereinafter, referred to as two images) is formed on each pair of line sensors 121 by the light beams reflected by the half mirror 104 and divided into two by each pair of secondary image-forming lenses. Each pair of line sensors 121 performs a photoelectric conversion of the two images to output two image signals. The two images, i.e. the two image signals, have a phase difference in accordance with a focus state of the lens apparatus 1 (the image taking optical system).

When the lens apparatus 1 is in an in-focus state, the phase difference corresponding to an interval between the two images (between objects) shows a specific value. When the lens apparatus 1 is in a front focus state, the phase difference is smaller than the specific value. On the other hand, when the lens apparatus 1 is in a rear focus state, the phase difference is greater than the specific value. Thus, the focus detector 105 (AF sensor 120) has a function that detects a phase difference between objects (two images) formed by light which has entered the lens apparatus 1.

The two image signals from each pair of line sensors 121 are inputted to a focus detection calculator 106. The focus detection calculator 106 performs a correlation calculation with respect to the two image signals to calculate the phase difference between the image signals to calculate a defocus value of the lens apparatus 1 based on the phase difference. Thus, a plurality of defocus values corresponding to the plurality of line sensors 121 provided on the AF sensor 120 are calculated. The calculated plurality of defocus values are inputted to a lens controller (a focus controller) 107 and an object distance calculator (a distance calculator, a distance information generator, and a ranging position output device) 114. In the embodiment, the object distance means a distance from the lens apparatus 1 or the camera 2 to the object, and the distances to the plurality of objects in the image-taking range (the image-taking screen) are able to be measured (calculated).

In the lens apparatus 1 of the present embodiment, when a manual focusing which will be described below is performed for an object by a user, a highly-accurate AF focusing is performed for the object. Therefore, the lens controller 107 selects the smallest defocus value from the inputted plurality of defocus values as an AF defocus value.

The user may arbitrarily select an AF area (a focus detecting area) that is a ranging area for which a focusing is to be performed from the plurality of ranging areas by the operation of an operating member such as an arrow key. In this case, a defocus value obtained by using a pair of line sensors included in the AF area is calculated as an AF defocus value.

The lens controller 107 detects a rotational position of the focus driving ring 102, i.e. a position of the focus lens, via a focus position detector 108. The lens controller 107 also detects a rotational position of the zoom driving ring 103, i.e. a position of the magnification-varying lens, via a zoom position detector 111.

The lens controller 107 calculates a moving distance of the focus lens based on detected positions of the focus lens and the magnification-varying lens and the AF defocus value. The moving distance is a moving distance of the focus lens for obtaining the in-focus state with respect to objects whose two images are formed on a pair of line sensors 121 which have outputted image signals which are a base for calculating the AF defocus value.

The lens controller 107 drives the focus motor 110 via a focus driver 109 to rotate the focus driving ring 102 so that the focus lens moves in an optical axis direction by the calculated moving distance. Thus, the AF (auto-focus) is performed.

In the lens apparatus 1 of the present embodiment, a focus command signal from a focus operating member (a focus switch, not shown) which is operated by the user is inputted to the lens controller 107. The lens controller 107 drives the focus motor 110 via the focus driver 109 in accordance with the focus command signal to rotate the focus driving ring 102. Thus, the manual focusing is performed by a servo control.

Further, a zoom command signal from a zoom operating member (zoom switch, not shown) which is operated by the user is inputted to the lens controller 107. The lens controller 107 drives the zoom motor 113 via a zoom driver 112 to rotate the zoom driving ring 103 in accordance with the zoom command signal. Thus, the magnification-varying lens moves and the manual zooming is performed by the servo control.

Figure 3:
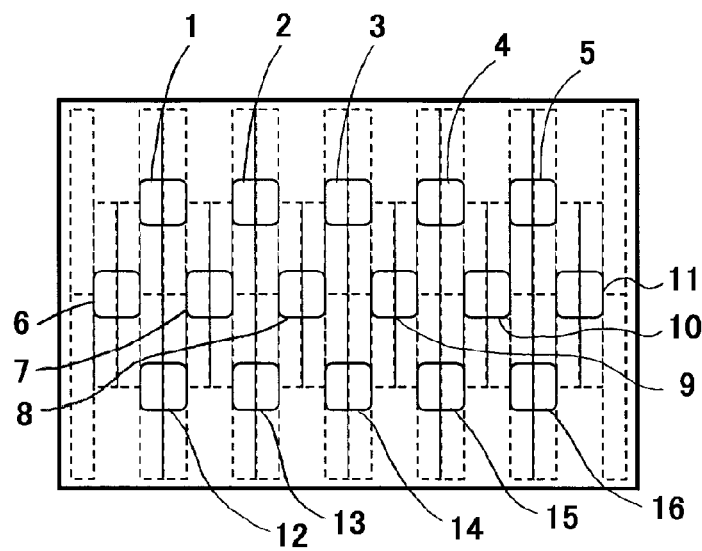
FIG. 3 is a diagram showing an example of ranging areas in Embodiment 1.

FIG. 3 shows an example of setting ranging areas in the image-taking range. An object distance calculator 114 stores a plurality of positions of ranging areas (coordinates, coordinates in the image-taking range, and position information corresponding to the coordinates in an image-taking screen or the like) and a shape (size) of the ranging areas.

FIG. 3 shows an example in which ten ranging areas where five out of the ten ranging areas are in line in a lateral direction in each of the upper part and the lower part of the image-taking range, and six ranging areas which is in line in the lateral direction in the middle in an upward and downward direction are arranged. Ranging areas 1 to 5, ranging areas 6 to 11, and ranging areas 12 to 16 are arranged so as to be in order from the upper left, in order from the left in the middle of the image-taking range, and in order from the lower left, respectively. When the setting in the object distance calculator 114 is changed, at least one of the positions, the sizes, and the number of the ranging areas can also be changed. Therefore, in the AF sensor 120 shown in FIG. 2, a lot of line sensors 121 are arranged so that the user can select the positions, the sizes, or the number of the ranging areas in the image-taking range with high degree of freedom.

Each ranging area is set so as to include the plurality of pairs of line sensors 121. In FIG. 3, the line sensors 121 shown in FIG. 2 are indicated by dotted lines.

A plurality of defocus values obtained by using the plurality of pairs of line sensors 121 on the AF sensor 120 are inputted from the focus detection calculator 106 to the object distance calculator 114. The object distance calculator 114 calculates a distance to the object (object distance) for each ranging area based on the defocus value obtained by using one pair of line sensors 121 selected out of the plurality of pairs of line sensors 121 included in each ranging area as follows. In other words, the object distance is calculated based on the output of the AF sensor 120 that is a phase difference sensor.

In the embodiment, the object distance represents a distance between the lens apparatus 1 (an incident surface of the image pickup element or a surface of a lens arranged at a position closest to the object) and the object. A method of selecting "the pair of line sensors 121" will be described below. When the AF sensor 120 is used as a sensor for calculating a defocus value used for an AF (focus control) and a sensor for calculating the object distance, the configuration of the lens apparatus 1 can be simplified as compared with the case where these are separately provided.

The object distance calculator 114 loads a defocus value for each ranging area, a current focus lens position detected by the focus position detector 108, and a current magnification-varying lens position detected by the zoom position detector 111. Subsequently, the object distance calculator 114 calculates a focus lens position which is an in-focus position with respect to the object included in the ranging area (in-focus lens position) from the defocus value and the current focus lens position. Further, the object distance calculator 114 calculates the object distance based on the in-focus lens position and the current magnification-varying lens position.

In FIG. 1, a line which connects the object distance calculator 114 with the focus position detector 108 and the zoom position detector 111 is omitted.

A ranging area extracting part (an extractor) 115 extracts a ranging area that is a target for generating distance information (extracting target: hereinafter, referred to as a distance display target) which is superimposed with a shot image generated by the camera 2 out of the ranging areas 1 to 16. The ranging area extracting part 115 previously stores an extraction condition that is criteria for the extraction. The extraction condition will be described below.

In the embodiment, the "distance information" may be an object distance calculated by the object distance calculator 114, or may be a difference between objects (a relative distance). In the embodiment, as the distance information, the object distance (also referred to as object distance information) is superimposed with the shot image to display it.

The ranging area extracting part 115 is connected with a lens communicator 116. The lens communicator 116 transmits and receives data by a serial communication with a camera communicator 204 provided in the camera 2. The lens communicator 116 transmits object distance information of the ranging area extracted as a distance display target and coordinate information of the ranging area (position information) to the camera communicator 204.

The focus detection calculator 106, the lens controller 107, the object distance calculator 114, the ranging area extracting part 115, and the lens communicator 116 are included in a lens CPU 130.

Reference numeral 117 indicated by a dotted line in FIG. 1 denotes an exclusion ranging area selecting switch (SW) which is used in Embodiment 3 described below.

In camera 2, a signal outputted from the CCD 201 is inputted to a video signal processor 202. The video signal processor 202 performs various kinds of processes for the signal outputted from the CCD 201 to generate a video signal (a shot image). The video signal is outputted to an image synthesizer (an output image generator) 203.

The object distance information and the ranging area coordinate information inputted from the lens apparatus 1 via the camera communicator 204 are inputted to the image synthesizer 203. The image synthesizer 203 generates an output video signal (an output image) by synthesizing the video signal with the object distance information. Specifically, the output image superimposed with the object distance information at a position dependent on the ranging area coordinate information in the shot image. The position dependent on the ranging area coordinate information is preferably a position where a distance from the ranging area is equal to or less than ⅕ of a screen diagonal length, a position where at least a part of the object distance information is superimposed with the ranging area, or a position where all of the object distance information is included in the ranging area. The output video signal is outputted to a display part 205 or an outside of the camera 2.

The video signal processor 202, the image synthesizer 203, and the camera communicator 204 are included in a camera CPU 210.

Figure 4:
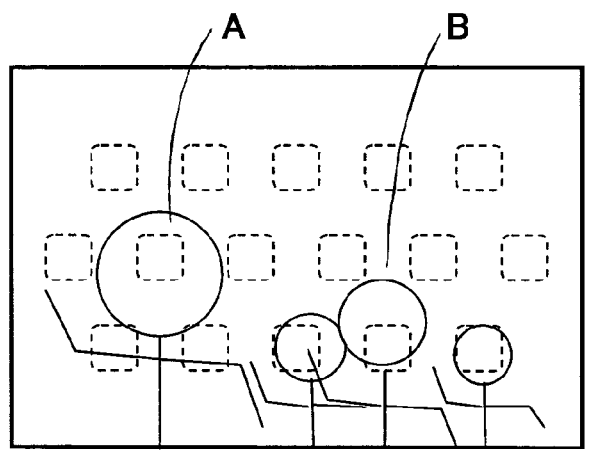
FIG. 4 is a view showing an example of a shot image in Embodiment 1.

FIG. 4 shows a shot image of a marathon in a case where ranging areas 1 to 16 shown in FIG. 3 (indicated by dot lines in the drawing) are set. In the embodiment, a condition where a runner A who leads in the race and a second group B formed by three runners who run behind the runner A are shot is shown. The runner A is positioned at a distance of 20 meters from the lens apparatus 1, and the runners of group B are positioned at distances of 31, 30, and 32 meters in order from the left.

In the present embodiment, as an extraction condition, a condition that is suitable for a shot composition shown in FIG. 4 is set. As one of shot configurations in a marathon live, there is a configuration where a broadcasting van runs at a constant distance from a runner to take an image of the runner from the broadcasting van. In this case, a rough distance range from the lens apparatus 1 in which the runner can exist is easily obtained. Therefore, in the present embodiment, the distance range from the lens apparatus 1 in which the runner can exist (first range: hereinafter referred to as a distance range DA) is set as the extraction condition.

When two or more ranging areas cover the same runner or a group of runners who have a short distance difference among one another, performing one distance display is sufficient. Therefore, in the present embodiment, a range of a distance difference in which it can be determined that the same runner or the group of runners exists (second range: hereinafter referred to as a distance range DB) is also set as the extraction condition. In the present embodiment, the distance range DA is set to 5 to 50 meters, and the distance range DB is set to 0 to 2 meters. Thus, runner groups are divided into a group including the runner A who leads in the race and a group including the group B to perform one distance display per group. The distance ranges DA and DB can be arbitrarily changed by a user.

Figure 5:
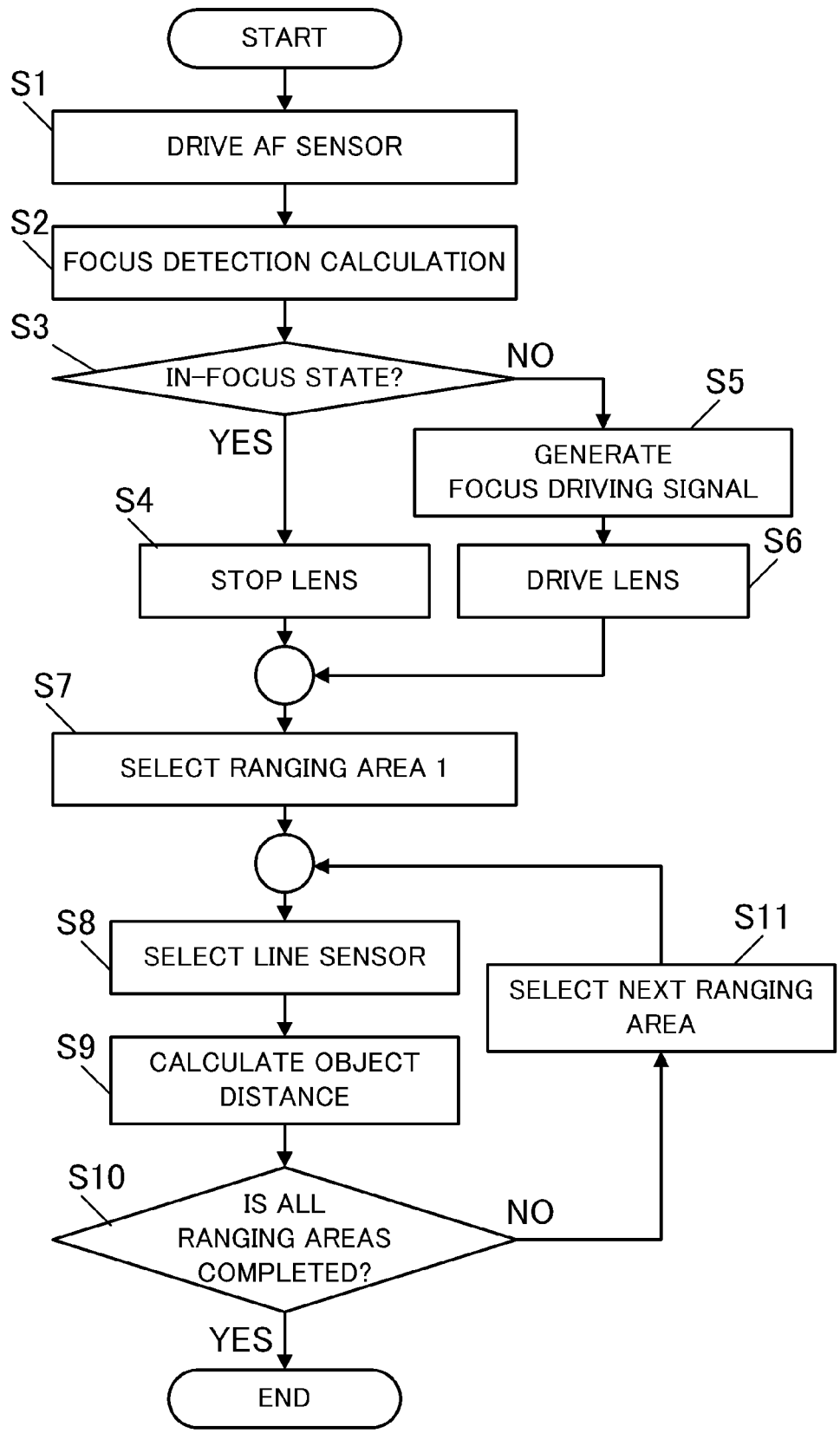
FIG. 5 is a flowchart showing a flow of an AF process and a calculation process of an object distance in Embodiment 1.

The flowchart of FIG. 5 shows a flow of an AF process and a calculation process of an object distance in the lens apparatus 1. The lens CPU 130 controls these processes in accordance with a computer program stored in a memory (not shown).

When the power of the lens apparatus 1 is turned on, the process of the lens CPU 130 proceeds to Step S1 to drive the AF sensor 120 of the focus detector 105. Then, in Step S2, the focus detection calculator 106 calculates a defocus value based on a phase difference obtained by each pair of line sensors 121. The lens controller 107 selects the smallest defocus value out of a plurality of defocus values inputted from the focus detection calculator 106 as an AF defocus value.

Next, in Step S3, the lens controller 107 checks a current focus lens position by using the focus position detector 108 to determine whether or not the AF defocus value is a value in an in-focus range. When the AF defocus value is a value in the in-focus range, the lens controller 107 identifies the current state as an in-focus state to proceed to Step S4 to maintain stopping the focus lens. Then, the process of the lens CPU 130 proceeds to Step S7.

On the other hand, when the AF defocus value is not in the in-focus range, the lens controller 107 proceeds to Step S5 to calculate an in-focus lens position based on the AF defocus value and the current focus lens position. Then, the lens controller 107 generates a focus driving signal which is given to the focus driver 109 to move the focus lens to the in-focus lens position.

Next, in Step S6, the lens controller 107 outputs the focus driving signal to the focus driver 109. Thus, the focus motor 110 is driven and the focus driving ring 102 rotates, and the focus lens moves to the in-focus lens position. Then, the process of the lens CPU 130 proceeds to Step S7.

In Step S7, first, the object distance calculator 114 selects the ranging area 1 out of the ranging areas 1 to 16 shown in FIG. 3.

Next, in Step S8, the object distance calculator 114 selects a pair of line sensors used for the ranging calculation out of the plurality of pairs of line sensors 121 included in the selected ranging area. Specifically, the object distance calculator 114 performs a correlation calculation for obtaining a degree of coincidence of two image signals outputted from each pair of line sensors 121. Then, a pair of line sensors which has the highest degree of coincidence of the two images is selected as a pair of line sensors for ranging.

In Step S9, the object distance calculator 114 calculates an object distance in the selected ranging area using a defocus value obtained based on a phase difference between the two image signals from the pair of line sensors for ranging and the current focus lens position and the magnification-varying lens position.

In Step S10, the object distance calculator 114 determines whether or not the calculation of the object distances in all ranging areas 1 to 16 is completed. If the calculation is not completed, the process proceeds to Step S11 to select the next ranging area to repeat the process of Steps S8 to S10. If the calculation of the object distances in all the ranging areas is completed, the process is finished.

Figure 6:
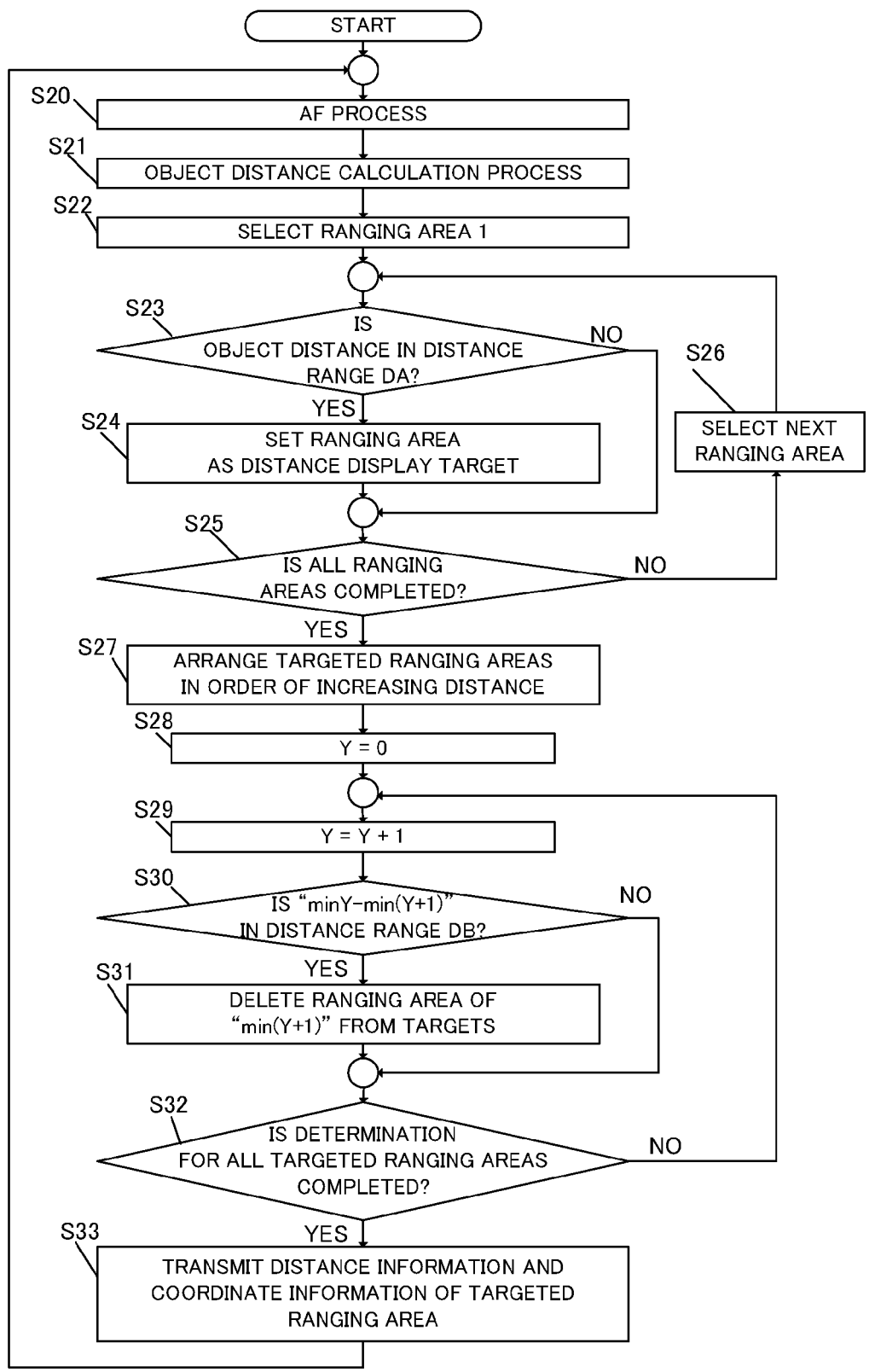
FIG. 6 is a flowchart showing a flow of a ranging area extraction process in Embodiment 1.

The flowchart of FIG. 6 shows a flow of a ranging area extraction process performed by the lens CPU 130. The lens CPU 130 controls the process in accordance with a computer program stored in a memory (not shown).

When the AF process in Steps S1 to S6 of FIG. 5 is performed in Step S20 and further the calculation process of the object distances in all the ranging areas in Steps S7 to S11 in Step S21, the process proceeds to Step S22.

In Step S22, first, the ranging area extracting part 115 in the lens CPU 130 selects the ranging area 1 out of the ranging areas 1 to 16 shown in FIG. 3.

Next, in Step S23, the ranging area extracting part 115 determines whether or not the object distance of the selected ranging area is in the distance range DA (in the first range), i.e. whether or not the ranging area is a distance display target. When the object distance is in the distance range DA, the process proceeds to Step S24 to set the ranging area as a ranging area that is the distance display target. Then, the process proceeds to Step S25. On the other hand, when the object distance of the selected ranging area is not in the distance range DA, it is determined that the ranging area is not the distance display target, and the process proceeds to Step S25.

In Step S25, the ranging area extracting part 115 determines whether or not the determination of the distance display target with respect to all the ranging areas 1 to 16 is completed. If the determination is not completed, the process proceeds to Step S26 to select the next ranging area to repeat the process of Steps S23 to S25. If the determination of the distance display target with respect to all the ranging areas is completed, the process proceeds to Step S27.

Figure 7:
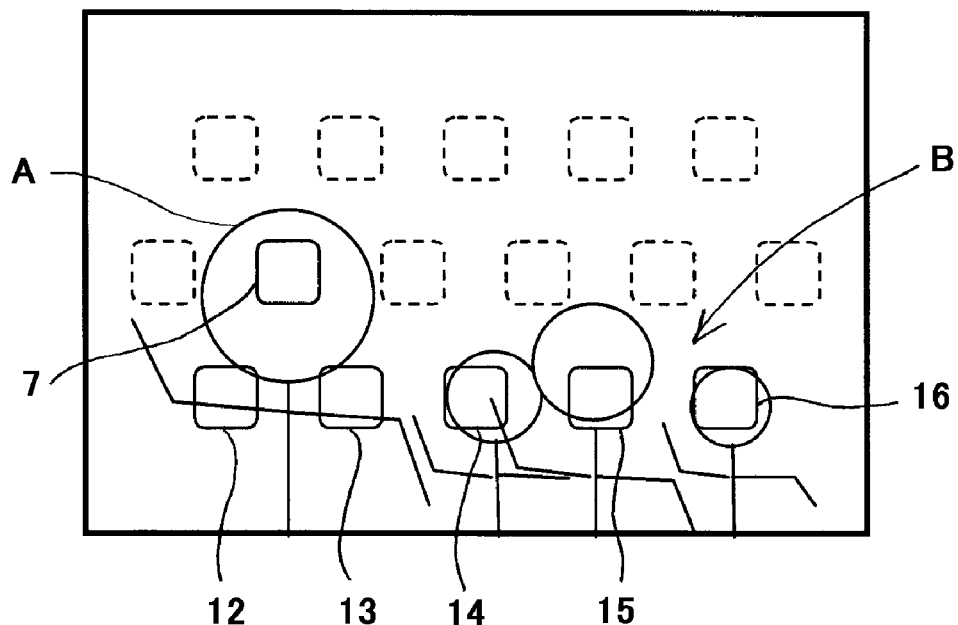
FIG. 7 is a view showing an example of setting a target by a distance range DA in Embodiment 1.

In the process described above, the extraction of the ranging area by the distance range DA is completed. The situation where the extraction of the ranging area by the distance range DA is performed in the shot composition shown in FIG. 4 is shown in FIG. 7. The ranging areas 7, and 12 to 16 (indicated by solid lines) which cover the runner A and the group B that are main objects are set as distance display targets, and the ranging areas (indicated by dotted lines) which cover the background that is another object are out of the distance display targets.

Next, the extraction of the ranging area by the distance range DB will be described. In Step S27, the ranging area extracting part 115 lays the ranging areas set as distance display targets by the distance range DA in order of increasing the object distance. In the embodiment, the ranging area of the shortest object distance is defined as min1, and in order of increasing the object distance, the ranging areas are defined as min2, min3, and the like. Hereinafter, a number added after each of "min" (1, 2, 3, . . . ) is defined as a variable Y.

In Step S28, the ranging area extracting part 115 substitutes an initial value of zero into Y. Next, in Step S29, the ranging area extracting part 115 increments the value of Y by one.

Next, in Step S30, the ranging area extracting part 115 calculates a difference between the object distances of minY and min(Y+1) (hereinafter, referred to simply as a distance difference) to determine whether or not the distance difference is in the distance range DB (in the second range). If it is in the distance range DB, the process proceeds to Step S31 to exclude the ranging area of min(Y+1) from the distance display targets and the process proceeds to Step S32. On the other hand, if the distance difference is not in the distance range DB, the process proceeds to Step S32 while maintaining setting the ranging area of min(Y+1) as the distance display target.

In Step S32, the ranging area extracting part 115 determines whether or not the determination of the distance range DB with respect to all ranging areas that are distance display targets by the distance rang DA is completed. If the determination is not completed, the process returns to Step S29 to repeat the process of Step S29 to S32. If the determination is completed, the process proceeds to Step S33.

Figure 8:
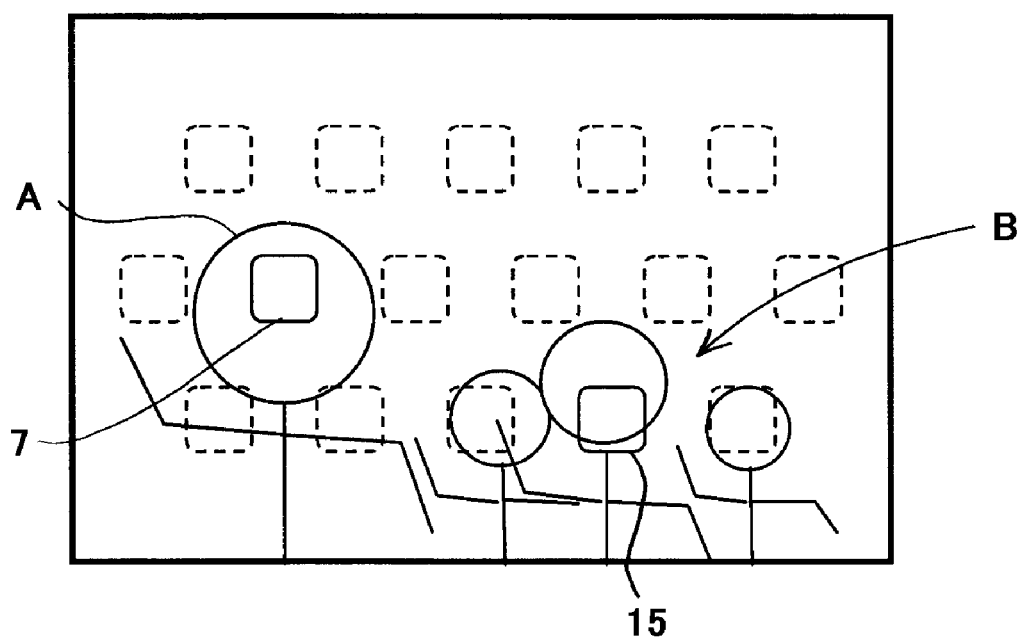
FIG. 8 is a view showing an example of setting a target by a distance range DB in Embodiment 1.

In the above process, the extraction of the ranging areas by the distance range DB is completed. In FIG. 8, the ranging areas 7 and 15 which have been extracted as final distance display targets by the distance range DB out of the ranging areas that are distance display targets shown in FIG. 7. are shown. The ranging areas 12 and 13 (indicated by dotted lines) are excluded from the distance display targets because the distance difference with respect to the ranging area 7 is small, i.e. because they are ranging areas which cover the same object. Further, the ranging areas 14 and 16 (indicated by dotted lines) are excluded from the distance display targets because the distance difference with respect to the ranging area 15 is small, i.e. because they are ranging areas which cover a group of runners. Therefore, for the group including the runner A and the group including the group B, the ranging areas 7 and 15 (indicated by solid lines) are set as final distance display targets, respectively.

In Step S33, the ranging area extracting part 115 transmits object distance information and coordinate information of each of the ranging areas 7 and 15 set as the distance display targets to the camera 2 via the lens communicator 116. When the transmission is completed, the lens CPU 130 repeats the process from Step S20 again.

Figure 9:
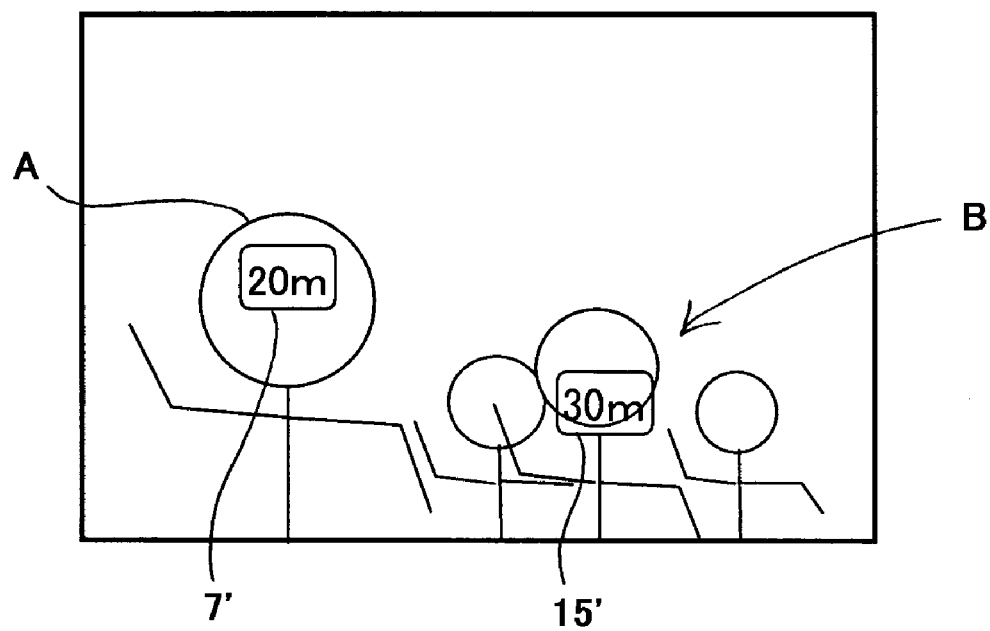
FIG. 9 is a view showing a display example of distance information in Embodiment 1.

In FIG. 9, an output image generated by the image synthesizer 203 of the camera 2 which has received the object distance information and the coordinate information is shown. The output image is displayed on the display part 205 or is outputted to broadcast. This is true for other embodiments described below. The AF is performed so as to focus the runner A.

In the shot image generated by the camera 2, letters "20 m" and "30 m" indicating the object distances are superimposedly displayed at positions 7' and 15' corresponding to the ranging areas 7 and 15 set as the distance display targets, i.e. positions depending on the coordinate information.

Thus, in the present embodiment, the distance ranges DA and DB that are extraction conditions of the distance display targets are set in advance to be able to display the object distance of only the object for which the distance display is to be performed out of a plurality of objects along with the shot image. In other words, even if a camera operator does not operate to select the object, the ranging area, or the like, the object or the ranging area for which the distance display is performed can be automatically selected. Therefore, the distance to a runner or a group of runners can be easily indicated without a focusing operation for ranging by the camera operator in a marathon live.

In the present embodiment, when a plurality of pairs of line sensors are included in each ranging area, a pair of line sensor which has the highest degree of coincidence of two image signals is selected and the object distance is calculated based on a phase difference obtained by using the pair of line sensors. However, a method of calculating the object distance is not limited to this.

For example, a plurality of object distances are calculated based on phase differences obtained by each of the plurality of pairs of line sensors in each ranging area, and the average value of the object distances may be the object distance in the ranging area. With respect to the plurality of object distances obtained by using the plurality of line sensors provided in each ranging area, the weighting depending on the position of the line sensor may also be performed to select or generate one object distance in accordance with a predetermined regulation from the weighted objected distance.

In the present embodiment, when there are two or more ranging areas in which the distance difference is in the distance range DB, the process where the ranging area having the shortest object distance (the closest ranging area) is set as a distance display target is performed. However, the ranging area which ranges a head of a runner whose object distance is comparatively stable (for example, the uppermost part in a shot image) out of the two or more ranging areas may be set as the distance display target. Further, the average value of the object distance in the two or more ranging areas may be treated as the object distance of the ranging area.

In addition, a ranging system shown in the present embodiment is a so-called TTL type ranging system which includes the focus detector 105 inside the lens apparatus and uses light from an image taking optical system, but the present invention is not limited to this. For example, the object distance to an object in a ranging area may be measured by using a ranging sensor (an external measuring sensor) for an external measurement (receiving light from an optical system different from the image taking optical system of the lens apparatus) which is provided outside of the lens apparatus. This is true for other embodiments described below.

Embodiment 2

Embodiment 2 of the present invention will be described with reference to FIGS. 10 to 12. In a marathon, it is often the case that a police officer rides a motorcycle to guide runners. When the runner who is guided by the police officer is shot, the police officer is also included in an image-taking screen.

In the extraction condition described in Embodiment 1, since the police officer also exists in the distance range in which a runner may exist, the ranging area covering the police officer is also set as a distance display target and an unnecessary distance display to the police officer is performed. In the present embodiment, an extraction condition suitable for this case will be described.

Figure 10:
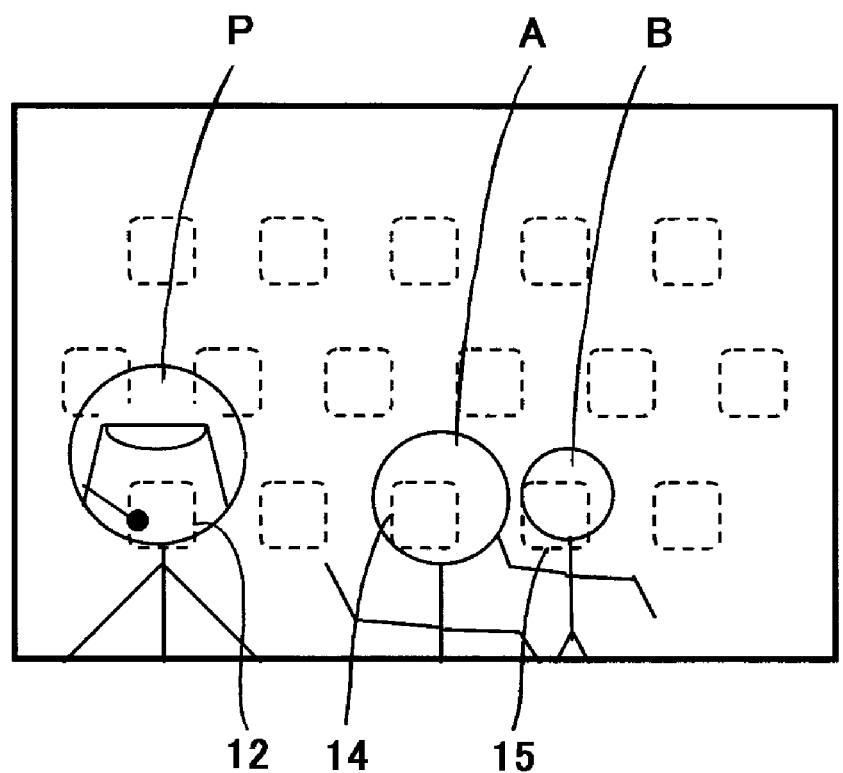
FIG. 10 is a view showing an example of a shot image in Embodiment 2 of the present invention.

FIG. 10 shows a situation (a shot image) where a police officer guides runners. There is a police officer P at the left side of the shot image, a top runner A in the middle of the shot image, and a second runner B at the right of the shot image. The object distances from the lens apparatus 1 to the police officer, the runner A, and the runner B are 15 meters, 20 meters, and 30 meters, respectively.

In the present embodiment, as the extraction condition, in addition to the distance ranges DA and DB described in Embodiment 1, a condition that the ranging area which has the shortest object distance (the closest ranging area) is excluded from the distance display target is added.

The police officer P stays necessarily ahead in the image-taking screen in order to guide the runners A and B. Therefore, the closest ranging area among the ranging areas set as distance display targets by the distance ranges DA and DB covers the police officer. Displaying the distance to the police officer can be prevented by excluding the closest ranging area from the distance display targets.

The configuration of the image taking system, the configuration of the AF sensor, and the arrangement of the ranging area is the same as those shown in FIGS. 1 to 3 of Embodiment 1. Elements common to those of Embodiment 1 are denoted by the same reference numerals as those of Embodiment 1.

Figure 11:
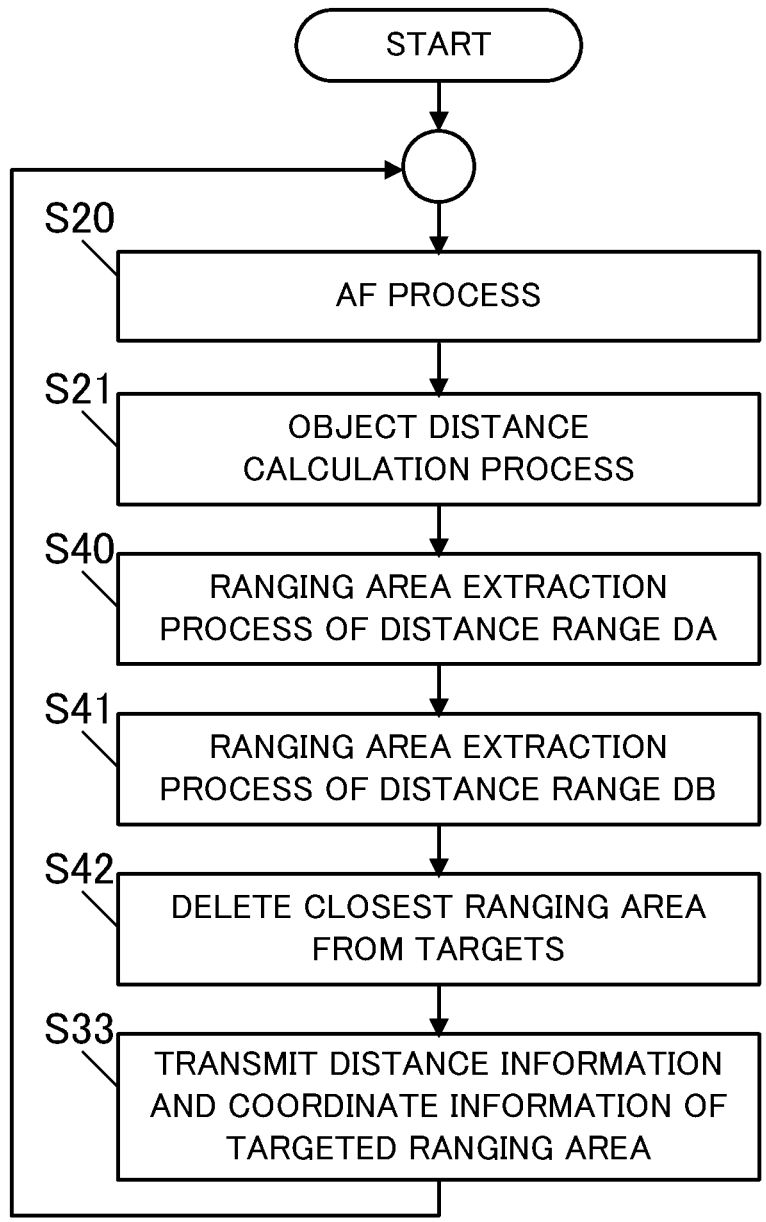
FIG. 11 is a flowchart showing a flow of a ranging area extraction process in Embodiment 2.

A flowchart of FIG. 11 shows a flow of a ranging area extraction process by the lens CPU 130 of the present embodiment. The lens CPU 130 controls the process in accordance with a computer program stored in a memory (not shown).

In Steps S20 and S21, the lens CPU 130 performs an AF process and a calculation process of the object distance as shown in FIG. 6 in Embodiment 1.

Next, in Step S40, the ranging area extracting part 115 performs an extraction process of the ranging area by the distance range DA, similarly to Steps S22 to S26 of Embodiment 1. Further, in Step S41, the ranging area extracting part 115 performs an extraction process of the ranging area by the distance range DB, similarly to Steps S27 to S32 shown in FIG. 6 of Embodiment 1. Thus, when the extraction process of the ranging areas by the distance ranges DA and DB is completed, the process proceeds to Step S42.

In Step S42, the ranging area extracting part 115 excludes the closest ranging area 12 out of the ranging areas 12, 14, and 15 set as the distance display targets by the distance range DB. Then, the process proceeds to Step S33.

In Step S33, similarly to Embodiment 1, the ranging area extracting part 115 transmits the object distance information and the coordinate information of each of the ranging areas 14 and 15 finally set as the distance display targets to the camera 2 via the lens communicator 116. When the transmission is completed, the lens CPU 130 repeats the process from Step S20 again.

Figure 12:
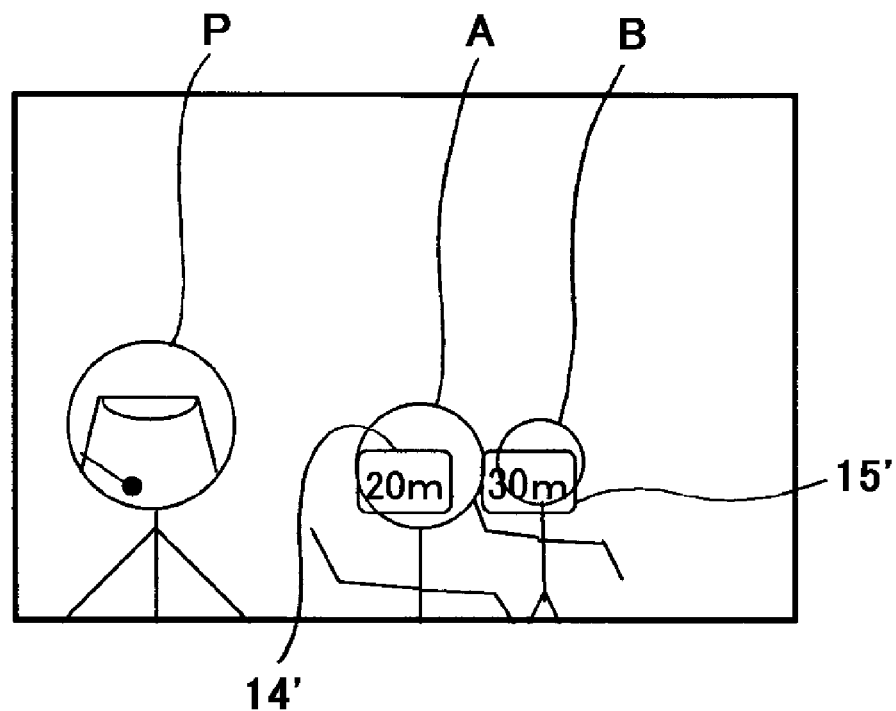
FIG. 12 is a view showing a display example of distance information in Embodiment 2.

FIG. 12 shows an output image generated by the image synthesizer 203 of the camera 2 which has received the object distance information and the coordinate information. The AF is performed so as to focus the runner A. The letters "20 m", and "30 m" indicating the object distances are superimposedly displayed at positions 14' and 15' corresponding to the respective ranging areas 14 and 15, i.e. positions depending on the coordinate information, set as the distance display targets among the shot images generated by the camera 2. However, the distance display is not performed at a position corresponding to the ranging area 12 excluded from the distance display targets.

According to the present embodiment, in a marathon live, a ranging area covering an object other than runners who exist in a distance range in which the runners may exist, like a police officer who guides runners, can be automatically excluded from the distance display target. As a result, the distance display only for runners can be performed.

In the present embodiment, the case where the closest ranging area is excluded from the distance display target has been described, but the ranging area that is to be excluded is not limited to the closest one. For example, if the distance display is necessary only for the first to third runners, the ranging areas covering the fourth and later runners, in order of increasing the object distance, can also be excluded. In other words, the ranging area where the order of the object distance is a certain order may also be excluded from the distance display targets.

Further, in the present embodiment, the case where the ranging area covering the police officer is determined in accordance with the order of the object distance has been described. However, in a real shooting, the lens apparatus 1 may focus the top runner instead of the police officer. Therefore, even if the lens apparatus 1 set an extraction condition that excludes a ranging area (at a close side) having an object distance shorter than a ranging area which is currently in an in-focus state, the distance display for the leading police officer can be prevented.

Embodiment 3

Embodiment 3 of the present invention will be described with reference to FIGS. 13 to 15. In a marathon, since runners run on a public load, it is often the case that there are spectators on a side road or the like. In this case, the spectators may be included in the image-taking screen. In the extraction condition described in Embodiment 1, since the spectators also exist in a distance range in which a runner may exist, the distance display for the spectators is performed. In the present embodiment, an extraction condition that is suitable for this case will be described.

Figure 13:
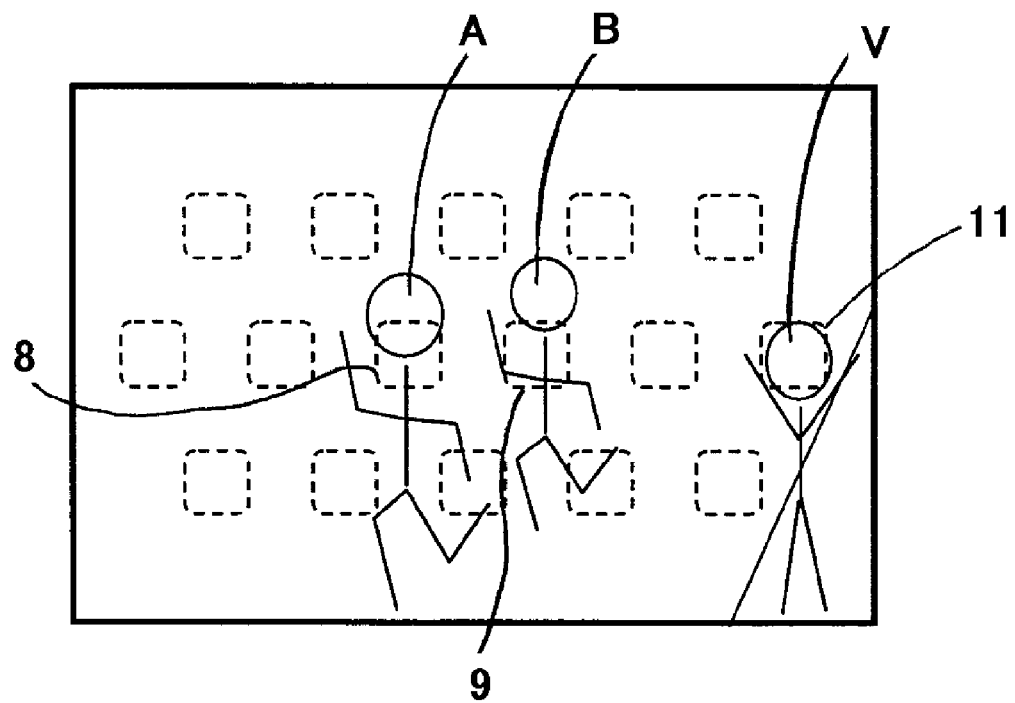
FIG. 13 is a view showing an example of a shot image in Embodiment 3 of the present invention.

In FIG. 13, a shot image in which runners and a spectator on the side road are included is shown. The top runner A is running at the left of the image-taking screen, and the second runner B is running at the center of the image-taking screen. There is a spectator V at the right side. The object distances from the lens apparatus 1 is 20 meters to the runner A, 25 meters to the runner B, and 18 meters to the spectator.

In the present embodiment, as an extraction condition, in addition to the distance ranges DA and DB described in Embodiment 1, a condition that excludes a predetermined ranging area 11 is excluded from the distance display target is added.

In a marathon, because the shot composition is roughly determined in advance, a position where a spectator on the side road is shot is predictable. Therefore, the distance display for the spectator can be prevented by excluding the ranging area of the position where the spectator is shot.

The configuration of the image taking system, the configuration of the AF sensor, and the arrangement of the ranging areas of the present embodiment is the same as those shown in FIGS. 1 to 3 of Embodiment 1, and elements common to those of Embodiment 1 are denoted by the same reference numerals as those of Embodiment 1. However, in the present embodiment, as indicated by dotted lines in FIG. 1, an exclusion ranging area selecting switch (selector) 117 is provided for the spectator selecting arbitrarily the ranging area to be excluded from the distance display target.

Figure 14:
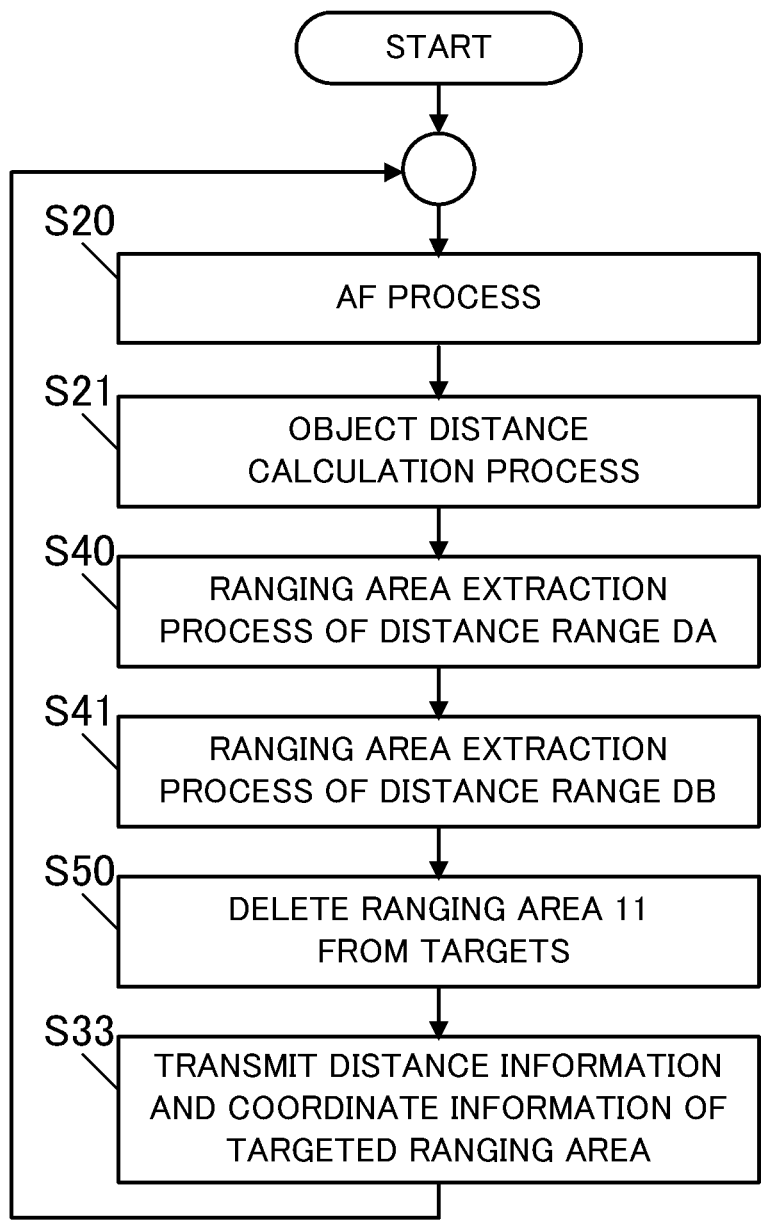
FIG. 14 is a flowchart showing a flow of a ranging area extraction process in Embodiment 3.

A flowchart of FIG. 14 shows a flow of a ranging area extraction process by the CPU 130 of the present embodiment. The lens CPU 130 controls the process in accordance with a computer program stored in a memory (not shown).

In Steps S20 and S21, as shown in FIG. 6 of Embodiment 1, the lens CPU 130 performs an AF process and a calculation process of an object distance. In Steps S40 and S41, as shown in FIG. 11 of Embodiment 2, the ranging area extracting part 115 performs an extraction process of the ranging area by the distance ranges DA and DB. Thus, when the extraction process of the ranging area by the distance ranges DA and DB is completed, the process proceeds to Step S50.

In Step S50, the ranging area extracting part 115 excludes an exclusion ranging area (the ranging area 11 in the embodiment) selected by an exclusion ranging area selecting switch 117 out of the ranging areas 8, 9, and 11 set as distance display targets. Then, the process proceeds to Step S33. If the exclusion ranging area is not previously set as the distance display target, the process proceeds to Step S33 without doing anything.

In Step S33, similarly to the case of Embodiment 1, the ranging area extracting part 115 transmits object distance information and coordinate information of each of the ranging areas 8 and 9 finally set as the distance display target to the camera 2 via the lens communicator 116. When the transmission is completed, the lens CPU 130 repeats the process from Step S20 again.

Figure 15:
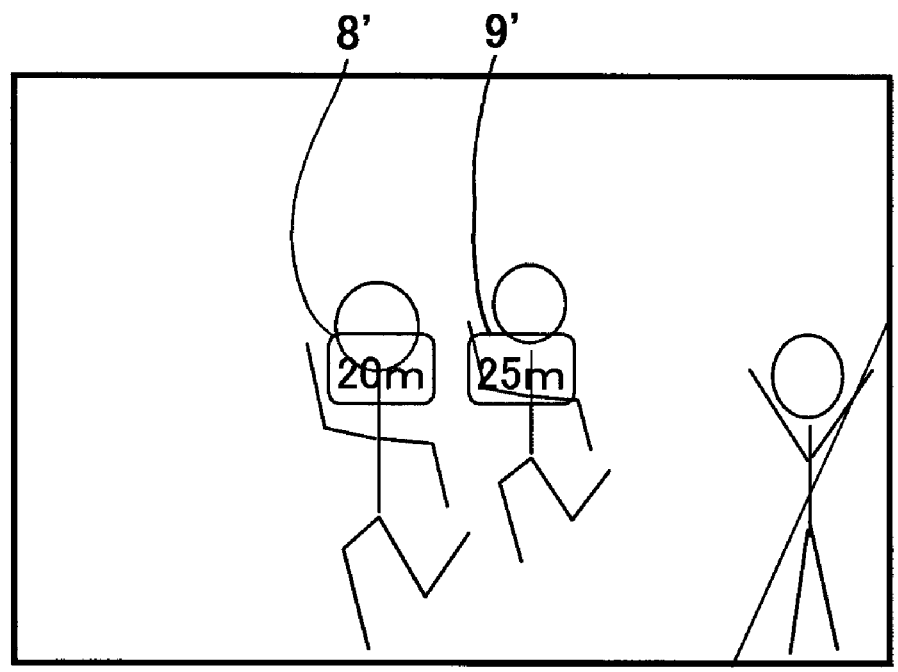
FIG. 15 is a view showing a display example of distance information in Embodiment 3.

In FIG. 15, an output image generated by the image synthesizer 203 of the camera 2 which has received the object distance information and the coordinate information is shown. The AF is performed so as to focus the runner A. Among the shot image generated by the camera 2, letters "20 m" and "25 m" indicating the object distances are superimposedly displayed at positions 8' and 9' corresponding to the ranging areas 8 and 9 set as the distance display targets, i.e. positions depending on the coordinate information. However, the distance display is not performed at a position corresponding to the ranging area 11 excluded from the distance display targets.

According to the present embodiment, in a marathon live, the ranging area covering an object other than runners which exists out of the distance range in which the runners may exist can be automatically excluded from the distance display target based on an exclusion setting by a camera operator. As a result, the distance display only for the runners can be performed.

In the present embodiment, a ranging area that is to be excluded is manually selected by the exclusion ranging area selecting switch 117, but similarly to other extraction conditions, the ranging area that is to be excluded may also be stored in advance.

In the present embodiment, the example where one ranging area 11 is excluded has been described, but it is not limited to this and a condition where a plurality of ranging areas are excluded may also be applied.

Embodiment 4

Embodiment 4 of the present invention will be described with reference to FIGS. 16 to 18. In a marathon, it is often the case that a variety of objects other than runners are included in an image-taking screen. For example, there is a triangular cone which is arranged in a marathon course. Since the triangular cone is set in a distance range where the runners may exist, the distance display is performed for the triangular cone in the extraction condition described in Embodiment 1. In the present embodiment, an extraction condition suitable for the case will be described.

Figure 16:
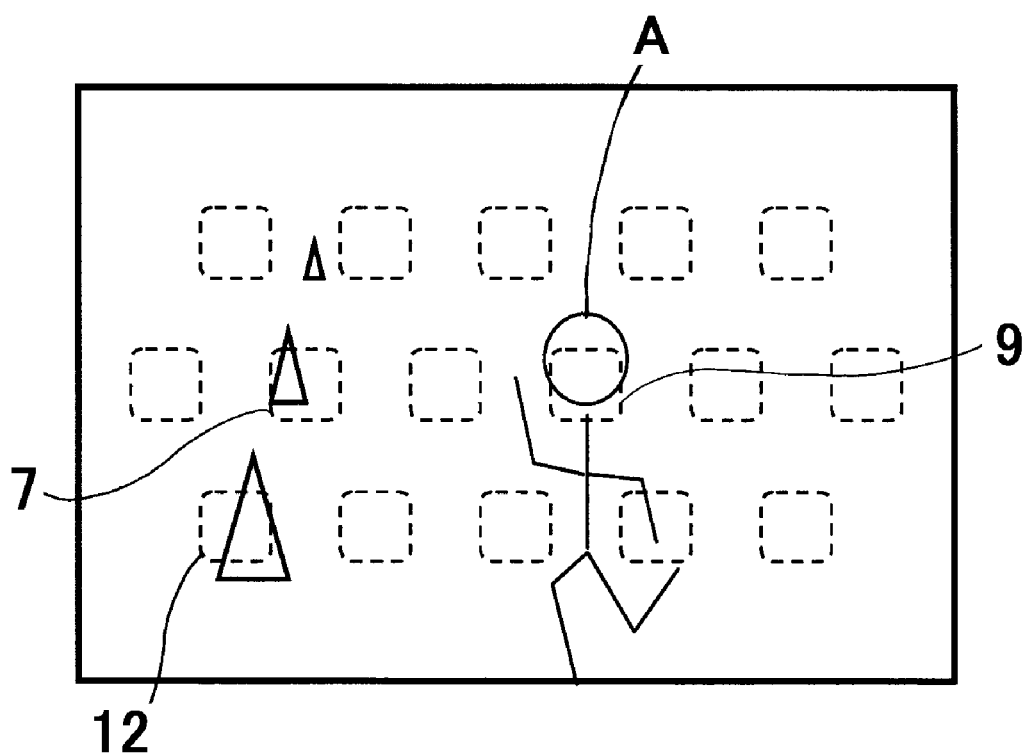
FIG. 16 is a view showing an example of a shot image in Embodiment 4 of the present invention.

In FIG. 16, a shot image in which a runner and triangular cones set in the course is shown. The runner A runs at a position which is distant from the lens apparatus 1 by an object distance of 20 meters.

In the present embodiment, as an extraction condition, in addition to the distance ranges DA and DB described in Embodiment 1, a condition where a ranging area in which the change of the object distance is greater than a predetermined value is excluded from the distance display target is added.

In a marathon, because a broadcasting van (lens apparatus 1) runs at a constant distance from a runner, there is rarely change of the distance between the lens apparatus 1 and the runner. On the other hand, the distance between a motionless object like a triangular cone and the lens apparatus 1 changes as the broadcasting van runs. Further, since the motionless object comes and goes with respect to a ranging area, the object distance calculated in the ranging area is not stable. Therefore, an amount of changes of the object distance in each ranging area is observed for a given length of time to determine that a ranging area whose amount of changes is beyond a predetermined value has covered the motionless object (has not covered a runner) to exclude the ranging area from the distance display target. Thus, the distance display for an object other than the object such as a triangular cone can be prevented.

The configuration of an image taking system, the configuration of an AF sensor, and the arrangement of ranging areas of the present embodiment are the same as those shown in FIGS. 1 to 3 of Embodiment 1, and elements common to those of Embodiment 1 are denoted by the same reference numerals as those of Embodiment 1.

Figure 17:
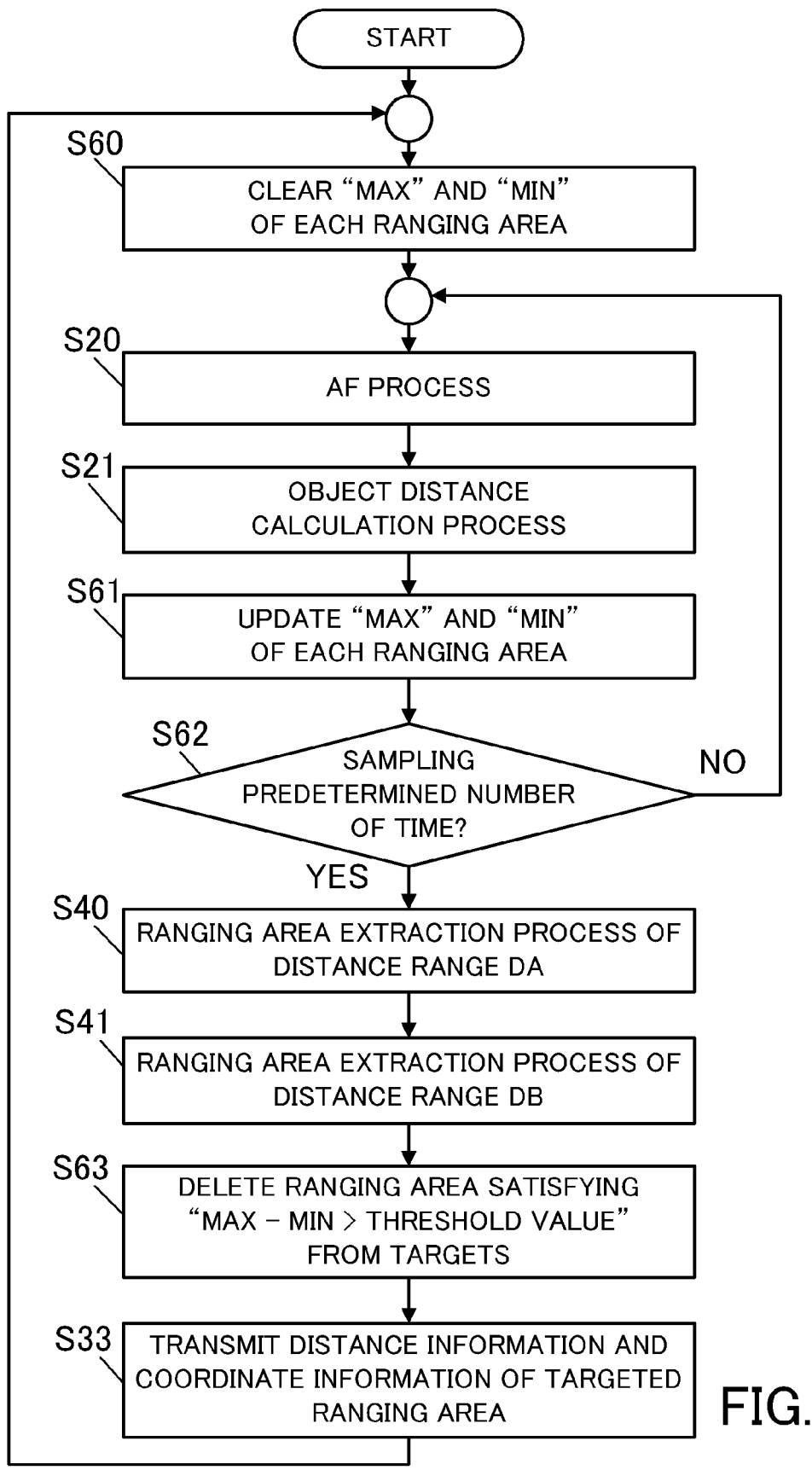
FIG. 17 is a flowchart showing a flow of a ranging area extraction process in Embodiment 4.

A flowchart of FIG. 17 shows a flow of a ranging area extraction process by the CPU 130 of the present embodiment. The lens CPU 130 controls the process in accordance with a computer program stored in a memory (not shown).

In Step S60, the ranging area extracting part 115 clears a value of a maximum value (variable MAX) and a minimum value (variable MIN) of the object distance in each ranging area. The term "clear" means that 0 meter that is the minimum value of the object distance is substituted for the variable MAX, and for example the value of 1000 meters is substituted as a value of the object distance which is sufficiently large with respect to the variable MIN.

In Steps S20 and S21, the lens CPU 130 performs the AF process and the calculation process of the object distance as shown in FIG. 6 of Embodiment 1.

In Step S61, when the object distance calculated in each ranging area is greater than the variable MAX, the ranging area extracting part 115 updates the object distance of the value of the variable MAX to the object distance. On the other hand, when the object distance calculated in each ranging area is smaller than the variable MIN, the ranging area extracting part 115 updates the value of the variable MIN to the object distance.

In Step S62, the ranging area extracting part 115 determines whether or not the process of Steps S20 to S61 is repeated predetermined sampling number of times. The process of Steps S20 to S61 is repeated up to the predetermined sampling number of times. When the process is repeated the predetermined sampling number of times, it proceeds to Step S40. The sampling number of times in the embodiment means the sampling number of times which is sufficient to detect changes of the object distance. In other words, the ranging area extracting part 115 detects the changes of the object distance in a predetermined time in which the process of Steps S20 to S61 is repeated.

In Steps S40 and S41, as shown in FIG. 11 of Embodiment 2, the ranging area extracting part 115 performs extraction processes of the ranging area by the distance ranges DA and DB. Thus, when the extraction processes of the ranging area by the distance ranges DA and DB are completed, the process proceeds to Step S63.

In Step S63, the ranging area extracting part 115 determines whether or not the difference between the variables MAX and MIN, i.e. the amount of changes of the object distance, is greater than a threshold value that is a predetermined value in each of the ranging areas 7, 9, and 12 set as distance display targets by the distance ranges DA and DB.

The ranging areas 7 and 12 in which the difference between the variables MAX and MIN is greater than the threshold value are excluded from the distance display targets. Further, the process proceeds to Step S33 while the ranging area 9 in which the difference between the variables MAX and MIN is smaller than the threshold value (equal to or smaller than the threshold value) is set as the distance display target. The threshold value is an upper limit of the amount of changes of the object distance in a time corresponding to the predetermined sampling number of times for regarding the object as a motionless object.

In Step S33, similarly to the case of Embodiment 1, the ranging area extracting part 115 transmits object distance information and coordinate information of the ranging area 9 finally set as the distance display target to the camera 2 via the lens communicator 116. When the transmission is completed, the lens CPU 130 repeats the process from Step S20 again.

Figure 18:
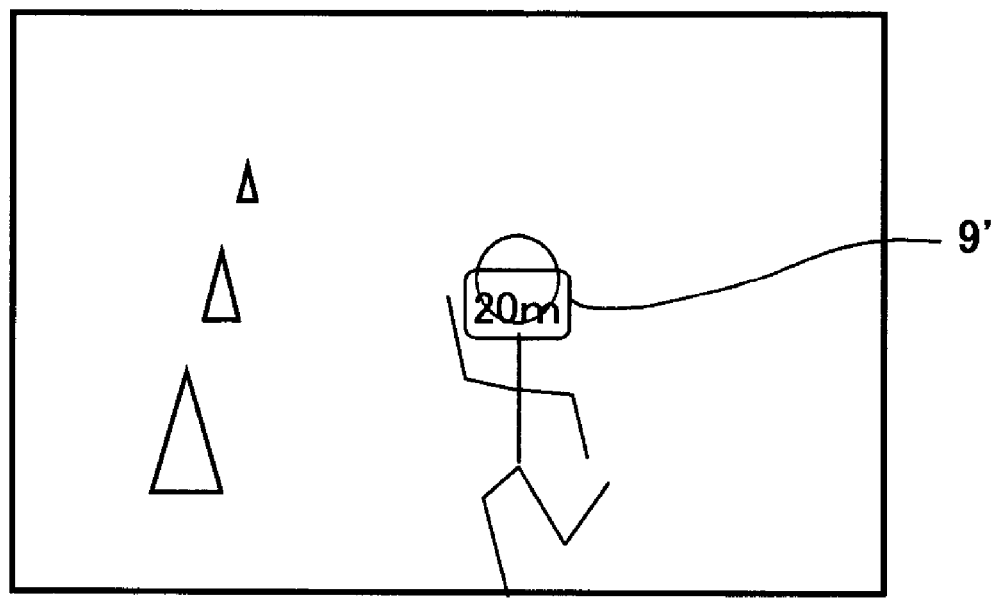
FIG. 18 is a view showing a display example of distance information in Embodiment 4.

An output image generated by the image synthesizer 203 of the camera 2 which has received the object distance information and the coordinate information is shown in FIG. 18. The AF is performed so as to focus the runner A. Among the shot image generated by the camera 2, letter "20 m" indicating the object distance is superimposedly displayed at positions 9' corresponding to the ranging areas 9 set as the distance display target, i.e. a position depending on the coordinate information. However, the distance display is not performed at positions corresponding to the ranging areas 7 and 12 excluded from the distance display target.

According to the present embodiment, in a marathon live, when a motionless object such as a triangular cone exists in a distance range in which a runner may exist, the motionless object can be automatically excluded from the distance display target by measuring the changes of the object distance. As a result, the distance display can be performed only for a runner.

In the present embodiment, the case where a ranging area in which an amount of changes of an object distance is determined as a motionless object (object other than a runner) when the runner is shot while a broadcasting van (lens apparatus 1) is running with the runner has been described. However, when a shooting is performed in a condition where the lens apparatus 1 is motionless, the object distance to the runner changes and the object distance to the motionless object other than runners does not change. In this case, the lens apparatus 1 may also be configured so that the amount of changes of the object distance is observed in a predetermined time, the object is determined as the motionless object when the amount of changes is smaller than a threshold value, and the ranging area covering the motionless object is excluded from the distance display target.

According to each of the above embodiments, a main object can be automatically selected from a plurality of objects which have distances different from each other, and the distance to the main object or the difference between the objects can be displayed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in Embodiments 1 to 4, the case where the object distance is displayed as distance information at a position corresponding to the ranging area of the distance display target in the shot image has been described. However, a distance difference between front and back runners (difference between object distances) may also be displayed instead of the object distance or along with the object distance. For example, the distance difference between a second runner and a top runner may also be displayed at a position corresponding to a ranging area covering the second runner.

A ranging area that is finally to be a distance display target may be set in combination with the extraction condition described in each of Embodiments 1 to 4. In order to deal with a variety of shot compositions, the extraction condition described in each of Embodiments 1 to 4 may also be selectively set in accordance with the operation of an operating member such as a switch.

In the present embodiment, the case where a serial communication is performed between the lens apparatus 1 and the camera 2 has been described, but the communicating method is not limited to this.

Further, in each of the above embodiments, the case where the object distance calculator 114 and the ranging area extracting part 115 are provided inside the lens apparatus 1 has been described, but at least one of them may also be provided in the camera 2. Further, the object distance calculator 114 and the ranging area extracting part 115 may be provided at an external device constituting a part of the image taking system, which is different from the lens apparatus 1 and the camera 2.

This application claims the benefit of Japanese Patent Application No. 2008-283931, filed on Nov. 5, 2008, which is hereby incorporated by reference herein in its entirety.

What is claimed is:

1. An image taking system comprising:
    a lens apparatus;
    a camera configured to take an image using the lens apparatus;
    a distance calculator configured to calculate an object distance in each of a plurality of ranging areas provided in an image-taking range;
    a distance information generator configured to generate distance information which indicates at least one of the object distance calculated by the distance calculator or a difference between the object distances;
    an extractor configured to:
        arrange the plurality of ranging areas, so that the object distances calculated by the distance calculator that are within a first range, in order of the object distance from shortest to longest;
        set at least two ranging areas, where the difference of the object distances between two adjacent ranging areas is within a second range, which is smaller than the first range, to one ranging area group;
        set the at least two ranging areas, where the difference of the object distances between the two adjacent ranging areas is outside the second range, into separate ranging area groups; and
        extract one ranging area from each ranging area group; and
    an output image generator configured to generate an output image including a shot image generated by the camera and the distance information corresponding to the one ranging area extracted by the extractor from each ranging area group.

2. An image taking system according to claim 1, further comprising:
    a ranging position output device configured to output position information which indicates a position of each of the ranging areas,
    wherein the output image generator is configured to generate the output image which is formed by superimposing the distance information corresponding to the ranging area extracted by the extractor at a position depending on the position information in the shot image.

3. An image taking system according to claim 1, wherein the extractor is configured to extract the ranging area where the object distance is the shortest out of the at least two ranging areas included in the ranging area groups.

4. An image taking system according to claim 1, wherein the extractor extracts the ranging area which is located at an upper most part of a shot image out of the at least two ranging areas included in the ranching area groups.

5. An image taking system according to claim 1, wherein when the object distance calculated by the distance calculator in at least two ranging areas is in the first range, the extractor excludes a ranging area whose object distance is shorter than a ranging area where the lens apparatus is in an in-focus state out of the two ranging areas as extracting targets.

6. An image taking system according to claim 1, further comprising:
  a selector configured to select at least one exclusion ranging area out of the plurality of ranging areas,
  wherein the extractor excludes the exclusion ranging area out of the ranging areas as extracting targets where the object distance calculated by the distance calculator is in the first range.

7. An image taking system according to claim 1, wherein the extractor extracts a ranging area where the object distance calculated by the distance calculator is in the first range and a change of the object distance is greater than a predetermined value from extracting targets.

8. A lens apparatus comprising:
  a distance calculator configured to calculate an object distance in each of a plurality of ranging areas provided in an image-taking range;
  a distance information generator configured to generate distance information indicating at least one of the object distance calculated by the distance calculator and or a difference between the object distances;
  an extractor configured to:
    arrange the plurality of ranging areas, so that the object distances calculated by the distance calculator that are within a first range, in order of the object distance from shortest to longest;
    set at least two ranging areas, where the difference of the object distances between two adjacent ranging areas is within a second range, which is smaller than the first range, to one ranging area group;
    set the at least two ranging areas, where the difference of the object distances between the two adjacent ranging areas is outside the second range, into separate ranging area groups; and
    extract one ranging area from each ranging area group; and
  an output device configured to output the distance information corresponding to the one ranging area extracted by the extractor from each ranging area group.

9. A lens apparatus according to claim 8, further comprising:
  a phase difference sensor configured to detect a phase difference between object images which are formed by light entering the lens apparatus,
  wherein the distance calculator calculates the object distance based on an output from the phase difference sensor.

10. A lens apparatus according to claim 9, further comprising a focus controller configured to perform a focus control based on the output from the phase difference sensor.

11. An image taking system according to claim 1, wherein the second range is a range within a predetermined distance.

* * * * *